US012159748B2

(12) United States Patent
Yan et al.

(10) Patent No.: US 12,159,748 B2
(45) Date of Patent: Dec. 3, 2024

(54) METHOD FOR IMPROVING CORROSION RESISTANCE OF HIGH ABUNDANCE RARE EARTH PERMANENT MAGNET

(71) Applicant: ZHEJIANG UNIVERSITY, Hangzhou (CN)

(72) Inventors: Mi Yan, Hangzhou (CN); Jiaying Jin, Hangzhou (CN); Wang Chen, Hangzhou (CN); Chen Wu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 299 days.

(21) Appl. No.: 17/712,163

(22) Filed: Apr. 3, 2022

(65) Prior Publication Data

US 2023/0282415 A1 Sep. 7, 2023

(30) Foreign Application Priority Data

Mar. 2, 2022 (CN) ......................... 202210199186.2

(51) Int. Cl.

| | |
|---|---|
| ***H01F 41/02*** | (2006.01) |
| ***C22C 38/00*** | (2006.01) |
| ***C22C 38/02*** | (2006.01) |
| ***C22C 38/06*** | (2006.01) |
| ***C22C 38/10*** | (2006.01) |
| ***C22C 38/12*** | (2006.01) |
| ***C22C 38/14*** | (2006.01) |
| ***C22C 38/16*** | (2006.01) |
| ***C22C 38/32*** | (2006.01) |
| ***C23C 8/10*** | (2006.01) |
| ***C23C 8/14*** | (2006.01) |

(52) U.S. Cl.

CPC ......... *H01F 41/026* (2013.01); *C22C 38/002* (2013.01); *C22C 38/005* (2013.01); *C22C 38/02* (2013.01); *C22C 38/06* (2013.01); *C22C 38/10* (2013.01); *C22C 38/12* (2013.01); *C22C 38/14* (2013.01); *C22C 38/16* (2013.01); *C23C 8/10* (2013.01); *C23C 8/14* (2013.01)

(58) Field of Classification Search

None

See application file for complete search history.

(56) References Cited

U.S. PATENT DOCUMENTS 4,902,357 A * 2/1990 Imaizumi .............. H01F 41/026 419/57
2008/0050581 A1* 2/2008 Miwa ...................... C23C 22/73 427/255.19

FOREIGN PATENT DOCUMENTS

JP 63062204 A * 3/1988 ........... H01F 41/026
JP 5146552 B2 * 2/2013

* cited by examiner

*Primary Examiner* — Alexander M Weddle

(57) ABSTRACT

A method for improving corrosion resistance of a high abundance rare earth permanent magnet by high temperature oxidation is provided. By the oxidation at 700~1000° C., a rare earth oxide film grows in-situ on the surface, which can greatly improve the corrosion resistance of the high abundance rare earth permanent magnet. The method makes full use of phase formation rule and diffusion kinetic behavior of high abundance rare earth elements La/Ce/Y, which is different from other rare earth elements Nd/Pr/Dy/Tb. The method grows the rare earth oxide film in situ with strong adhesion to the matrix, which can not only greatly improve the corrosion resistance of the magnet, but also improve the magnetic and mechanical properties. The method has advantages of green environmental protection, long service life and simple process, and can be popularized and applied in large quantities.

3 Claims, No Drawings

METHOD FOR IMPROVING CORROSION RESISTANCE OF HIGH ABUNDANCE RARE EARTH PERMANENT MAGNET

TECHNICAL FIELD

The disclosure relates to technical fields of corrosion protection, in particular to a method for improving corrosion resistance of a high abundance rare earth permanent magnet by high temperature oxidation.

BACKGROUND

Since the 1980s, the neodymium-iron-boron (NdFeB) permanent magnetic material has been widely used in the fields of energy, information, transportation, medical treatment, and national defense due to its excellent comprehensive magnetic properties. It is also a most important rare earth functional material and a key basic material of national economy. Among different fields of rare earth applications, NdFeB industry is also the largest one with fastest growth, consuming nearly half of total rare earth consumption annually. With the dramatically growing demand for NdFeB, rare earth elements such as Nd, Praseodymium (Pr), Dysprosium (Dy), and Terbium (Tb), which are in short supply, are consumed in large quantities. However, the high abundance rare earth elements such as Lanthanum (La), Cerium (Ce) and Yttrium (Y) have high reserves in the Earth's crust, but for a long time are rarely used in the field of rare earth permanent magnets. Therefore, the development of high abundance rare earth permanent magnetic materials based on La, Ce and Y, and the realization of large-scale applications are research hotspots in the field of the rare earth permanent magnets in recent years.

Compared with NdFEB, both the main phase and the grain boundary phase of a high abundance rare earth permanent magnet exhibit different components and structures, which determine magnetic properties and corrosion resistance of the magnet. It has been found that the chemical components, structures and distributions of the grain boundary phase of the high abundance rare earth permanent magnet have more complex local characteristics, present new corrosion mechanisms, and even have a greater influence on corrosion resistance than traditional NdFeB magnets. At present, the common methods to improve the corrosion resistance of NdFEB magnets include alloying and surface protection. First, alloying can increase the electrode potential of the grain boundary phase and reduce the potential difference between the grain boundary phase and the main phase, but the effect is very limited. Second, the water and other corrosive solutions which may corrode the magnet can be isolated by coating a protective layer on the surface, which however, easily causes environmental pollution with waste liquid. Meanwhile, the binding force between the protective layer and the NdFeB matrix is relatively weak, which cannot endure for a long server time. For the high abundance rare earth permanent magnets, a lot of research focuses on the improvement of magnetic properties, while less attention is paid to the improvement of corrosion resistance. How to improve the corrosion resistance of the high abundance rare earth permanent magnet may surpass the magnetic performance and become a difficult issue to limit its application. It is urgent to make new technological breakthroughs.

SUMMARY

An object of the disclosure is to overcome the shortage of the related art and provides a method for improving corrosion resistance of a high abundance rare earth permanent magnet by high temperature oxidation.

Specifically, the disclosure uses a high temperature oxidation method to grow a rare earth oxide film in situ on the surface of a high abundance rare earth permanent magnet, thereby greatly improving the corrosion resistance of the high abundance rare earth permanent magnet. The high temperature oxidation method includes performing a high temperature oxidation reaction in a heat treatment furnace, the temperature of the high temperature oxidation reaction is controlled to be in a range from 700 Celsius degrees (° C.) to 1000° C., the reaction time of the high temperature oxidation reaction is controlled to be in a range from 0.2 hours (h) to 5 h and the oxygen partial pressure during the high temperature oxidation reaction is less than $10^4$ Pascals (Pa).

In an embodiment, a thickness of the rare earth oxide film is continuously adjustable in a range from 10 nanometers (nm) to 100 micrometers (μm).

In an embodiment, components of the high abundance rare earth permanent magnet, measured in atomic percentages, are $(RE_aRE'_{1-a})_x(Fe_bM_{1-b})_{100-x-y-z}M'_yB_z$, RE is one or more selected from the group consisting of lanthanum (La), cerium (Ce) and yttrium (Y), RE' is one or more of other lanthanide elements except for La, Ce and Y, Fe is an iron element, M is one or more selected from the group consisting of cobalt (Co) and nickel (Ni), M' is one or more selected from the group consisting of niobium (Nb), zirconium (Zr), tantalum (Ta), vanadium (V), aluminum (Al), copper (Cu), gallium (Ga), titanium (Ti), chromium (Cr), molybdenum (Mo), manganese (Mn), silver (Ag), gold (Au), lead (Pb) and silicon (Si), B is a boron element; and a, b, x, y and z satisfy the following conditions: $0.25 \le a \le 1$, $0.8 \le b \le 1$, $12 \le x \le 18$, $0 \le y \le 2$ and $5.5 \le z \le 6.5$.

Compared with the related art, the disclosure has the advantages that:

(1) The disclosure aims at the high abundance rare earth permanent magnet. Based on the root cause of its corrosion failure, the disclosure makes full use of the phase formation rule and diffusion kinetic behavior of the high abundance rare earth element La/Ce/Y, which is different from other rare earth elements such as traditional Nd/Pr/Dy/Tb. The disclosure also makes full use of the easy oxidation characteristics of the grain boundary phase enriched with rare earth elements to in-situ grow the rare earth oxide film with high chemical stability by the high temperature oxidation method. The high abundance rare earth permanent magnet materials with high corrosion resistance are prepared. At the same time, the high temperature heat treatment can also modify the microstructure and magnetic properties of the matrix. The rare earth oxide film is grown in situ, which has strong adhesion with the matrix and improves the mechanical properties at the same time. Therefore, the disclosure provides a method for improving the corrosion resistance of the high abundance rare earth permanent magnet by the high temperature oxidation, while improving magnetic properties and mechanical properties simultaneously. This method is different from the traditional anti-corrosion methods of NdFeB (the alloying and the surface protection), and does not sacrifice magnetic and mechanical properties.

(2) According to the high abundance rare earth permanent magnet with different components, based on its alloying component design and different states of grain boundary microstructure, distribution morphology, physical and chemical properties, deformation behavior and main phase/grain boundary phase interface state, combined with the microstructure evolution discipline in the process of the high temperature oxidation, the oxidation process is designed to regulate the oxygen partial pressure, oxidation temperature and reaction time, and the thickness is continuously adjustable from 10 nm to 100 μm. A new high temperature oxidation technology is established to prepare the high abundance rare earth permanent magnet materials with high corrosion resistance, good magnetic properties and good mechanical properties.

(3) Till now, the technology has no other reports at home and abroad, has substantial innovation, and will solve the key problem of poor corrosion resistance, which affects the development and application of the high abundance rare earth permanent magnets for a long time. Only one-step processing of the high temperature oxidation (700~1000° C.) is required. The technological process is simple and low-cost, which is suitable for batch application.

(4) The rare earth oxide film grown in situ on the surface of the high abundance rare earth permanent magnet after the high temperature oxidation has the advantages of densification, continuity and hydrophobicity. It poses rigid requirements for oxygen partial pressure, oxidation temperature and reaction time. Its products are different from NdFeB magnets after a low temperature oxidation, excluding Fe oxides and other products.

DETAILED DESCRIPTION OF THE EMBODIMENTS

The disclosure is further explained in conjunction with specific embodiments, but the disclosure is not limited to the following embodiments:

Embodiment 1

Components of a high abundance rare earth permanent magnet measured in atomic percentages are:

$[(Pr_{0.2}Nd_{0.8})_{0.5}Ce_{0.5}]_{13.9}(Fe_{0.98}Co_{0.02})_{78.6}(Cu_{0.2}Co_{0.2}Al_{0.3}Ga_{0.1}Zr_{0.2})_{1.5}B_6$.

By performing a high temperature oxidation reaction to the high abundance rare earth permanent magnet in a heat treatment furnace, the temperature is controlled at 900° C., the reaction time is controlled at 4 h and the oxygen partial pressure is 10 Pa.

The thickness of a rare earth oxide film grown on the surface of the high abundance rare earth permanent magnet in situ is ~7 μm (about 7 μm). Results of AMT-4 permanent magnetic measurement instrument show that the remanence and coercivity of the high abundance rare earth permanent magnet after the high temperature oxidation reaction (also referred to as surface oxidation treatment) are respective 12.4 kilo Gauss (kG) and 9.0 kilo Oersted (kOe). Results of AMETEK electrochemical workstation show that the corrosion current of the high abundance rare earth permanent magnet after the surface oxidation treatment is 7 microampere per square centimeter ($\mu A/cm^2$) in 3.5% sodium chloride (NaCl) solution.

Comparative Embodiment 1

The difference from the embodiment 1 is that the oxygen partial pressure during the high temperature oxidation of the high abundance rare earth permanent magnet is $10^5$ Pa. Results of the AMT-4 permanent magnetic measurement instrument show that the remanence and coercivity of the high abundance rare earth permanent magnet after the surface oxidation treatment are respective 12.3 kG and 8.5 kOe, which are lower than that of the embodiment 1. Results of the AMETEK electrochemical workstation show that the corrosion current of the high abundance rare earth permanent magnet after the surface oxidation treatment is 50 $\mu A/cm^2$ in 3.5% NaCl solution, which is larger than that of the embodiment 1.

Comparative Embodiment 2

The difference from the embodiment 1 is that the reaction time of the high temperature oxidation of the high abundance rare earth permanent magnet is 10 h. Results of the AMT-4 permanent magnetic measurement instrument show that the remanence and coercivity of the high abundance rare earth permanent magnet after the surface oxidation treatment are respective 12.2 kG and 7.9 kOe, which are lower than that of the embodiment 1. Results of the AMETEK electrochemical workstation show that the corrosion current of the high abundance rare earth permanent magnet after the surface oxidation treatment is 41 $\mu A/cm^2$ in 3.5% NaCl solution, which is larger than that of the embodiment 1.

Comparative Embodiment 3

The difference from embodiment 1 is that the high abundance rare earth permanent magnet is not treated with the high temperature oxidation. Results of the AMT-4 permanent magnetic measurement instrument show that the remanence and coercivity of the high abundance rare earth permanent magnet are respective 12.3 kG and 8.6 kOe, which are lower than that of the embodiment 1. Results of the AMETEK electrochemical workstation show that the corrosion current of the high abundance rare earth permanent magnet is 82 $\mu A/cm^2$ in 3.5% NaCl solution, which is more than one order of magnitude larger than that of the embodiment 1.

Comparative Embodiment 4

The difference from embodiment 1 is that the element contents of Cu and Co are improved. The components of the high abundance rare earth permanent magnet measured in atomic percentage are:

$[(Pr_{0.2}Nd_{0.8})_{0.5}Ce_{0.5}]_{13.9}(Fe_{0.98}Co_{0.02})_{77.1}(Cu_{0.4}Co_{0.3}Al_{0.15}Ga_{0.05}Zr_{0.1})_3B_6$. The high abundance rare earth permanent magnet is not treated with the high temperature oxidation. Results of the AMT-4 permanent magnetic measurement instrument show that the remanence and coercivity of the high abundance rare earth permanent magnet are respective 11.8 KG and 5.7 kOe, which are lower than that of the embodiment 1. Results of the AMETEK electrochemical workstation show that the corrosion current of the high abundance rare earth permanent magnet is 73 $\mu A/cm^2$ in 3.5% NaCl solution, which is more than one order of magnitude larger than that of the embodiment 1.

Comparative Embodiment 5

The difference with the embodiment 1 is that the high abundance rare earth permanent magnet is treated with surface coating to obtain a dark silver nickel coating without a high temperature oxidation treatment, and the thickness of the dark silver nickel coating is ~7 μm (about 7 μm). Results of the AMT-4 permanent magnetic measurement instrument show that the remanence and coercivity of the high abundance rare earth permanent magnet are respective 12.1 kG and 8.1 kOe, which are lower than that of the embodiment 1. Results of the AMETEK electrochemical workstation show that the corrosion current of the high abundance rare earth permanent magnet is 18 μA/$cm^2$ in 3.5% NaCl solution, which is larger than that of the embodiment 1.

Embodiment 2

Components of a high abundance rare earth permanent magnet measured in atomic percentages, are:

$[(Pr_{0.2}Nd_{0.8})_{0.55}(La_{0.15}Ce_{0.85})_{0.45}]_{15}Fe_{77.8}(Ga_{0.6}Cu_{0.2}Al_{0.25}Nb_{0.32})_{1}B_{5.83}$.

By performing a high temperature oxidation reaction to the high abundance rare earth permanent magnet in a heat treatment furnace, the temperature is controlled at 850° C., the reaction time is controlled at 5 h and the oxygen partial pressure is 0.5 Pa. The thickness of a rare earth oxide film grown on the surface of the high abundance rare earth permanent magnet in situ is ~3 μm (about 3 μm). Results of the AMT-4 permanent magnetic measurement instrument show that the remanence and coercivity of the high abundance rare earth permanent magnet after the surface oxidation treatment are respective 12.4 kG and 7.2 kOe. Results of AMETEK electrochemical workstation show that the corrosion current of the high abundance rare earth permanent magnet after the surface oxidation treatment is 12 μA/$cm^2$ in 3.5% NaCl solution. Comparative embodiment 6:

The difference from embodiment 2 is that the high abundance rare earth permanent magnet is not treated with the high temperature oxidation. Results of the AMT-4 permanent magnetic measurement instrument show that the remanence and coercivity of the high abundance rare earth permanent magnet are respective 12.4 kG and 5.6 kOe, which are lower than that of the embodiment 2. Results of the AMETEK electrochemical workstation show that the corrosion current of the high abundance rare earth permanent magnet is 135 μA/$cm^2$ in 3.5% NaCl solution, which is more than one order of magnitude larger than that of the embodiment 2.

Embodiment 3

Components of a high abundance rare earth permanent magnet measured in atomic percentages, are:

$[Nd_{0.75}(Y_{0.1}Ce_{0.9})_{0.25}]_{15.5}(Fe_{0.92}Co_{0.08})(Cu_{0.2}Ga_{0.1}Al_{0.35}Si_{0.2}Nb_{0.15})_{1.5}B_{6.1}$.

By performing a high temperature oxidation reaction to the high abundance rare earth permanent magnet in a heat treatment furnace, the temperature is controlled at 700° C., the reaction time is controlled at 5 h and the oxygen partial pressure is 0.5 Pa. The thickness of a rare earth oxide film grown on the surface of the high abundance rare earth permanent magnet in situ is ~800 nm. Results of the AMT-4 permanent magnetic measurement instrument show that the remanence and coercivity of the high abundance rare earth permanent magnet after the surface oxidation treatment are respective 12.6 kG and 12.2 kOe. Results of the AMETEK electrochemical workstation show that the corrosion current of the high abundance rare earth permanent magnet after the surface oxidation treatment is 20 μA/$cm^2$ in 3.5% NaCl solution.

Comparative Embodiment 7

The difference from embodiment 3 is that the high abundance rare earth permanent magnet is not treated with the high temperature oxidation. Results of the AMT-4 permanent magnetic measurement instrument show that the remanence and coercivity of the high abundance rare earth permanent magnet are respective 12.3 kG and 10.1 kOe, which are lower than that of the embodiment 3. Results of the AMETEK electrochemical workstation show that the corrosion current of the high abundance rare earth permanent magnet is 250 μA/$cm^2$ in 3.5% NaCl solution, which is more than one order of magnitude larger than that of the embodiment 3.

Embodiment 4

Components of the high abundance rare earth permanent magnet measured in atomic percentages, are:

$[(Pr_{0.2}Nd_{0.8})_{0.55}(La_{0.15}Ce_{0.85})_{0.45}]_{15}Fe_{77.8}(Ga_{0.6}Cu_{0.2}Al_{0.25}Nb_{0.32})_{1}B_{5.83}$.

By performing a high temperature oxidation reaction to the high abundance rare earth permanent magnet in a heat treatment furnace, the temperature is controlled at 900° C., the reaction time is controlled at 3 h and the oxygen partial pressure is 0.01 Pa. The thickness of a rare earth oxide film grown on the surface of the high abundance rare earth permanent magnet in situ is ~1 μm. Results of AMT-4 permanent magnetic measurement instrument show that the remanence and coercivity of the high abundance rare earth permanent magnet after the surface oxidation treatment are respective 11.5 kG and 7.1 kOe. Results of AMETEK electrochemical workstation show that the corrosion current of the high abundance rare earth permanent magnet after the surface oxidation treatment is 35 μA/$cm^2$ in 3.5% NaCl solution.

Comparative Embodiment 8

The difference from embodiment 4 is that the high abundance rare earth permanent magnet is not treated with the high temperature oxidation. Results of the AMT-4 permanent magnetic measurement instrument show that the remanence and coercivity of the high abundance rare earth permanent magnet are respective 11.2 kG and 6.1 kOe, which are lower than that of the embodiment 4. Results of the AMETEK electrochemical workstation show that the corrosion current of the high abundance rare earth permanent magnet is 580 μA/$cm^2$ in 3.5% NaCl solution, which is more than one order of magnitude larger than that of the embodiment 4.

What is claimed is:

1. A method for improving corrosion resistance of a rare earth permanent magnet, consisting of:

in situ growing a rare earth oxide film on a surface of the rare earth permanent magnet by an oxidation reaction;

wherein a temperature of the oxidation reaction is controlled to be in a range from 700 Celsius degrees (° C.) to 1000° C.; and components of the rare earth permanent magnet, measured in atomic percentages, are $(RE_aRE'_{1-a})_x(Fe_bM_{1-b})_{100-x-y-z}M'_yB_z$, RE is one selected from the group consisting of lanthanum (La), cerium (Ce) and yttrium (Y), RE' is one or more of other lanthanide elements except for La, Ce, and Y, Fe is an iron element, M is one or more selected from the group consisting of cobalt (Co) and nickel (Ni), M' is one or more selected from the group consisting of niobium (Nb), zirconium (Zr), tantalum (Ta), vanadium (V), aluminum (Al), copper (Cu), gallium (Ga), titanium (Ti), chromium (Cr), molybdenum (Mo), manganese (Mn), silver (Ag), gold (Au), lead (Pb) and silicon (Si), B is a boron element; and a, b, x, y and z satisfy the following conditions: $0.25 \le a < 1$, $0.8 \le b < 1$, $12 \le x \le 18$, $0 \le y \le 2$, and $5.5 \le z \le 6.5$.

2. The method according to claim 1, wherein the oxidation reaction to the rare earth permanent magnet is performed in a heat treatment furnace; and a reaction time of the oxidation reaction is controlled to be in a range from 0.2 hours (h) to 5 h and an oxygen partial pressure during the oxidation reaction is less than $10^4$ Pascals (Pa).

3. The method according to claim 1, wherein a thickness of the rare earth oxide film is in a range from 10 nanometers (nm) to 100 micrometers (μm).

* * * * *